United States Patent [19]

Streit

[11] Patent Number: 5,724,487
[45] Date of Patent: Mar. 3, 1998

[54] NEURAL NETWORK FOR MAXIMUM LIKELIHOOD CLASSIFICATION WITH SUPERVISED AND UNSUPERVISED TRAINING CAPABILITY

[76] Inventor: Roy L. Streit, 110 Ethel Dr., Portsmouth, R.I. 02871

[21] Appl. No.: 499,336

[22] Filed: Jul. 7, 1995

[51] Int. Cl.$^6$ .................... G06E 1/00; G06F 15/18
[52] U.S. Cl. .................... 395/24; 395/21; 395/23
[58] Field of Search .............. 395/20–27; 382/155–159

[56] References Cited

U.S. PATENT DOCUMENTS

| | | | |
|---|---|---|---|
| 4,979,126 | 12/1990 | Pao et al. | 395/24 |
| 5,226,092 | 7/1993 | Chen | 382/157 |
| 5,283,855 | 2/1994 | Motomura et al. | 395/27 |
| 5,566,273 | 10/1996 | Huang et al. | 395/23 |
| 5,590,218 | 12/1996 | Ornstein | 382/157 |

*Primary Examiner*—Tariq R. Hafiz
*Attorney, Agent, or Firm*—Michael J. McGowan; William F. Eipert; Prithvi C. Lall

[57] ABSTRACT

A neural network comprising an input layer, two hidden layers for generating an number of outcome class component values, and an output layer for classifying input vectors to an outcome class, under the assumption that the outcome classes are characterized by mixtures of component populations with each component population having a multivariate Gaussian likelihood distribution. The first hidden layer includes a number of first layer nodes each connected receive input vector components from the input layer and generates in response a first layer output value representing the absolute value of the sum of a function of the difference between each input vector component and a threshold value. The second hidden layer includes a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values connected thereto. The output layer includes a plurality of output layer nodes each associated with an outcome class. Each output layer node uses the output class component values from the second layer nodes in combination with weighting values to generate the likelihood that the input vector is properly classified to the output layer node's outcome class.

10 Claims, 1 Drawing Sheet

NEURAL NETWORK 10

5,724,487

NEURAL NETWORK FOR MAXIMUM LIKELIHOOD CLASSIFICATION WITH SUPERVISED AND UNSUPERVISED TRAINING CAPABILITY

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED APPLICATION AND INCORPORATION BY REFERENCE

U.S. patent application Ser. No. 08/499,243 in the name of Roy L. Streit, entitled Neural Network Architecture for Non-gaussian Components of a Mixture Density Function, incorporated by reference.

U.S. patent application Ser. No. 08/499,245 in the name of Roy L. Streit, entitled a Neural Network Architecture for Non-gaussian Components of a Mixture Density Function, incorporated by reference.

BACKGROUND OF THE INVENTION

(1) Field of the Invention

The invention relates generally to the field of electronic neural networks, and more particularly provides a new architecture for multi-layer neural networks, that is, neural networks having a plurality of hidden layers, and further provides new methodologies for providing supervised and unsupervised training of neural networks constructed according to the new architecture.

(2) Description of the Prior Art

Electronic neural networks have been developed to rapidly identify patterns in certain types of input data, or accurately to classify the input patterns into one of a plurality of predetermined classifications. For example, neural networks have been developed which can recognize and identify patterns, such as the identification of hand-written alphanumeric characters, in response to input data constituting the pattern of on and off picture elements, or "pixels," representing the images of the characters to be identified. In such a neural network, the pixel pattern is represented by, for example, electrical signals coupled to a plurality of input terminals, which, in turn, are connected to a number of processing nodes, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character which can be identified by the neural network, the one of the processing nodes which is associated with that character will generate a positive output signal, and the others will not. On the other hand, if the input signals do not represent a character that can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes. The weighting functions in, for example, the above-described character recognition neural network, essentially will represent the pixel patterns which define each particular character. Typically, each processing node will perform a summation operation in connection with values representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. Conventional non-linear functions which processing nodes may use in connection with the sum of weighted input signals is generally a step function, a threshold function, or a sigmoid, in all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase, in which input signals representing a number of training patterns for the types of items to be classified, for example, the pixel patterns of the various handwritten characters in the character-recognition example, are applied to the input terminals, and the output signals from the processing nodes are tested. Based on the pattern of output signals from the processing nodes for each training example, the weighting functions are adjusted over a number of trials. After the neural network has been trained, during an operational phase it can generally accurately recognize patterns, with the degree of success based in part on the number of training patterns applied to the neural network during the training stage, and the degree of dissimilarity between patterns to be identified. Such a neural network can also typically identify patterns which are similar, but not necessarily identical, to the training patterns.

Neural networks having a single layer of processing nodes, connected to receive input signals directly, often suffice for a number of applications. However, they are often not sufficient if, for example, widely diverse or complementary input patterns would be classified into the same class. A classical example is an exclusive-OR function, in which input patterns "00" and "11" both are in the same class, that is, the class having the value "0," and input patterns "01" and "10" also are in the same class, that is, the class having the value "1." In that case, neural networks have been developed which have a plurality of layers of processing nodes, typically a maximum of two layers, between the input terminals and the output nodes. Such multi-layer neural networks are described in, for example, D. Rumelhart, et al., "Learning Internal Representations By Error Propagation", in D. Rumelhart, et al. (ed) *Parallel Distributed Processing*, page 318 (MIT Press, 1986). In such a multi-layer neural network, the processing nodes at each layer (including the output nodes, which are also processing nodes) receive weighted input signals from the processing nodes at the next lower layer (or from the input terminals in the case of processing nodes at the first, lowest layer) and generates an output signal in the same manner as described above, that is, as a non-linear step, threshold or sigmoid function of the sum of the weighted input signals. In the cases of the processing nodes in the intermediate, "hidden" layers, they transmit their output signals to the processing nodes at higher layers. A multi-layer neural network is normally trained in the same manner as a single layer network, through the application of training patterns as described above.

3

One of the problems with conventional neural network architectures as described above is that the training methodology, generally known as the "back-propagation" method, is often extremely slow in a number of important applications. In addition, under the back-propagation method, the neural network may result in erroneous results which may require restarting of training, and even after a neural network has been through a training phase confidence that the best training has been accomplished may sometimes be poor. This is particularly the case with a multi-layer neural network, as the weighting functions generated during the training phase often cannot be interpreted in ways that readily provide understanding of what they particularly represent.

SUMMARY OF THE INVENTION

It is therefore an object of the invention to provide a new and improved architecture for a multi-layer neural network which facilitates the ready interpretation of the architectural and design features of the neural network, including the particular non-linear function for the nodes of the network and the weighting functions used in connection with output signals provided from each level to the next.

In brief summary, the invention provides a neural network for classifying input vectors to an outcome class, under the assumption that the outcome classes are characterized by mixtures of component populations with each component population having a multivariate Gaussian likelihood distribution. The neural network comprises an input layer for receiving the components of the input vector, two hidden layers for generating a number of outcome class component values, and an output layer that identifies an outcome class in response to the outcome class component values. The first hidden layer includes a number of first layer nodes each connected to receive input vector components from the input layer and generates in response a first layer output value representing the absolute value of the sum of a function of the difference between each input vector component and a threshold value. The second hidden layer includes a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values from first layer nodes connected thereto. The output layer includes a plurality of output layer nodes each associated with an outcome class. Each output layer node receives the output class component values from all of the second layer nodes and uses them, in combination with respective weighting values, to generate a value that represents the likelihood that the input vector is properly classified to the output layer node's outcome class.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
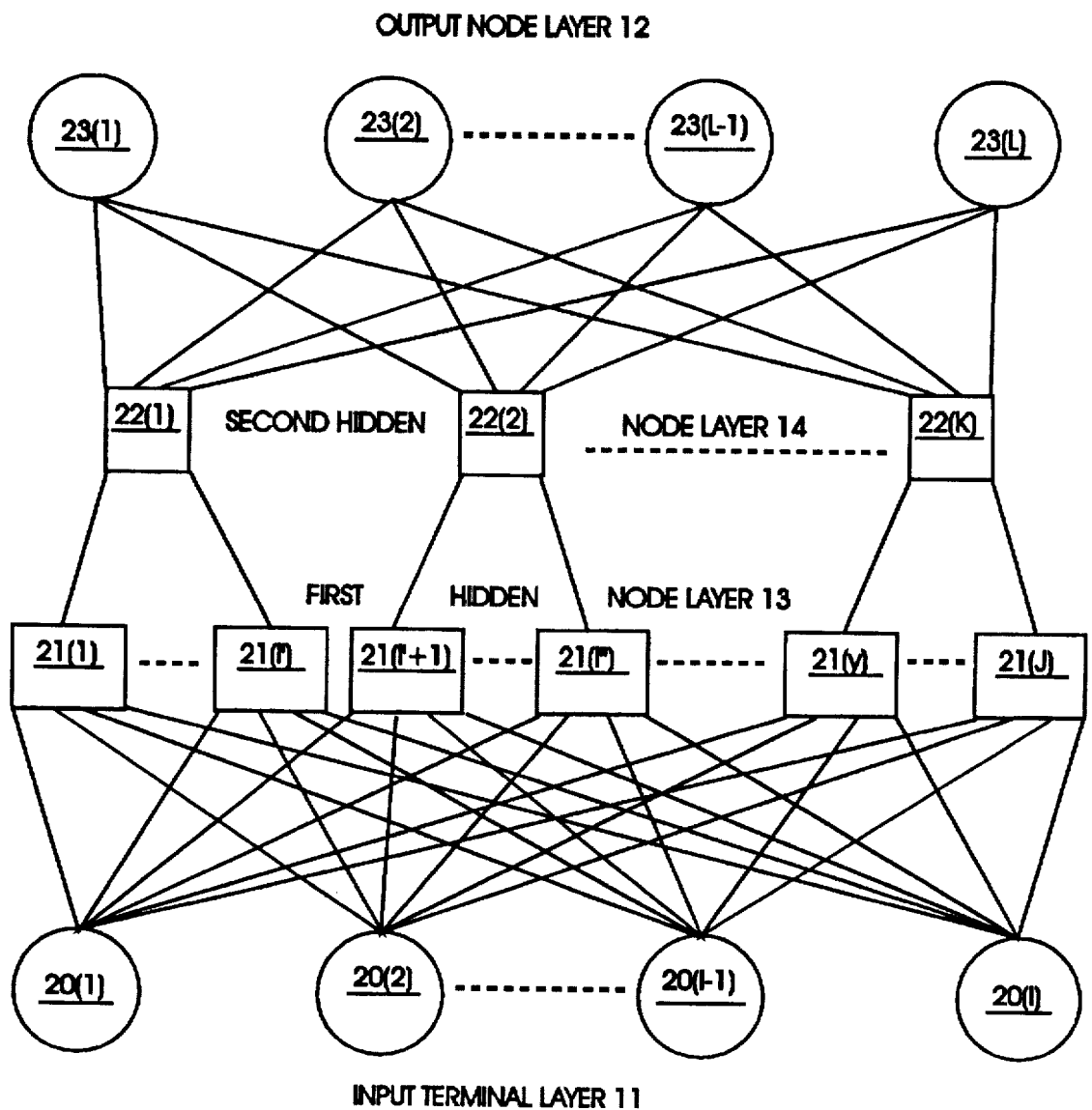
FIG. 1 is a general block diagram illustrating a neural network constructed in accordance with the new architecture.

FIG. 1 depicts a general block diagram illustrating a neural network 10 constructed in accordance with the new

4 architecture. With reference to FIG. 1, the neural network 10 includes an input terminal layer 11, an output node layer 12 and two hidden layers, including a first hidden node layer 13 and a second hidden node layer 14. The input terminal layer 11 includes a plurality of input terminals 20(1) through 20(I) [generally identified by reference numeral 20(i)] which receive input signals representing values which will be termed as comprising components $X_i$ of an input vector X. The input terminals do no processing on the input signals, but instead pass them directly to nodes 21(1) through 21(J) [generally identified by reference numeral 21(j)] of the first hidden node layer 13.

Each node 21(j) of the first hidden node layer 13 generates an output signal which it couples to one of a plurality of second layer nodes 22(1) through 22(K) [generally identified by reference numeral 22(k)] connected thereto in the second hidden node layer 14. Each first layer node 21(j) effectively weights the values represented by the input signals it receives according to a particular weighting value $w_1(i,j)$, generates a sum of the weighted input values and generates in response to the sum an output signal representing a value reflecting a non-linear function of the generated sum. Each weighting value $w_1(i,j)$ is determined during a training phase, as will be described below. All of the first layer nodes 21(j) use the same non-linear function, which will also be described below. Certain ones of the first layer nodes 21(j) are connected to each of the second layer nodes 22(k), that is, for example, first layer nodes 21(1) through 21(i') will be connected to second layer 22(1), first layer nodes 21(i'+1) through 21(i") will be connected to second layer node 22(2), and so forth.

Each second layer node 22(k) of the second hidden layer 14 also generates an output signal which it couples to a plurality of output nodes 23(1) through 23(L) [generally identified by reference numeral 23(l)] in the output node layer 12. Each second layer node 22(k) effectively weights the values represented by the output signals it receives from the first layer nodes 21(j) connected thereto according to a particular weighting value $w_2(j,k)$, generates a sum of the weighted values and generates in response to the sum an output signal representing a value reflecting a non-linear function of the generated sum. All of the second layer nodes 22(k) use the same non-linear function, but the non-linear function used with the second layer nodes 22(k) differs from the non-linear function used with the first layer nodes 21(j). In one particular embodiment, as described below the weighting values $w_2(j,k)$ used by the second layer nodes 22(k) are all the same, namely, "one," although as also described below the weighting values can be selected to differ from "one."

Each output node 23(l) in output node layer 12 receives output signals from all of the nodes 22(k) of the second hidden layer 14. Each output node also effectively weights the values represented by the output signals it receives from the nodes 22(k) of the second hidden layer 14 connected thereto according to a particular weighting value $w_3(k,l)$, generates a sum of the weighted second layer output signals, and generates in response an output signal, constituting its contribution to the output of neural network 10, which represents a value that reflects a linear function of the generated sum. As with the weighting values $w_1(i,j)$ used by the first layer nodes 21(j), the weighting values $w_3(k,l)$ used by the output nodes 23(l) are determined during the training phase.

The neural net 10 classifies an input vector X under the assumption that the outcome classes are characterized by mixtures of multivariate densities, with each of the "K"

component populations in the mixture having a multivariate Gaussian likelihood distribution. In that case, the nodes $21(j)$ and $22(k)$ of the hidden layers generate signals representing the value of the likelihood distribution for a particular component of the population in the mixture, with the signal from each node $22(k)$ in the second hidden layer providing the likelihood value for one of the components in the population. Each output node $23(l)$ in the output layer 12 receives the likelihood values from all of the "K" nodes $22(k)$ and generates in response a value indicating the likelihood that the input vector X is properly classified in the class associated with the respective output node $23(l)$. For example, in the aforementioned exclusive-OR example, the outcome classes are "0" and "1", while the components of the outcome classes would be determined as "00," "01," "10" and "11." In that example, the nodes $22(j)$ and $23(k)$ of the first and second layers 13 and 14 will generate values identifying the likelihood that the input vector X provided to the input terminals $20(i)$ of the input layer 11 represents each of the respective outcome classes, that is, the probabilities that the components of the input vector X represents the respective values "00," "01," "10" and "11," while the output nodes $24(l)$ will generate, in response to the values provided by the nodes $24(k)$ of the second layer, a value identifying the outcome class "0" or "1" into which the input vector is to be classified.

The following describes, first, the architectures of the hidden layers 13 and 14 and the architecture of the output layer 12. Thereafter will be described methodologies for performing both supervised and unsupervised training of the neural network 10 as described herein.

The architecture of hidden layers 13 and 14 is characterized by (1) the non-linear functions and any thresholds used by the nodes $21(j)$ and $22(k)$ in the hidden layers 13 and 14, (2) the numbers of nodes $21(j)$ in the first hidden layer 13 and the numbers of nodes $22(k)$ in the second hidden layer 14, (3) the interconnection weights $w_1(i,j)$ used by the nodes $21(j)$ in the first hidden layer 13, and (4) the interconnection weights $w_2(j,k)$ used by the nodes $22(k)$ in the second hidden layer.

Forms for each of these architectural elements are described below, although it should be appreciated that actual values for at least some of them will be determined during training of the neural network 10.

As noted above, the nodes $21(j)$ and $22(k)$ of the first and second hidden layers 13 and 14 generate signals representing the value of the likelihood distribution for a particular component of the population in the mixture, with the signal from each node $22(k)$ in the second hidden layer providing the likelihood value for one of the components in the population. Each of the components in the population is assumed to be conditionally independent (statistically) of the others, and so the architecture of each node $22(k)$ in the second hidden layer 14, and the nodes $21(j)$ in the first hidden layer 13 connected thereto, can be expressed independently of the others. It will be recognized, however, that, since the probability density functions are all assumed to have Gaussian distributions all will have the same general expressions, with the differences being the specific values applied to the respective expressions to train the neural network 10 for a particular application. Accordingly, for a node $22(k)$ in the second hidden layer 14, if the component population associated therewith has a multivariate Gaussian probability density function, the probability that an input vector X, having components $X_i$ ("i" being an index identifying the components of the vector), is an element of the particular component population represented by the node $22(j)$ is $$p(X) = \frac{1}{\sqrt{(2\pi)^n |CM|}} e^{-\frac{1}{2}(X-u)^T CM^{-1}(X-u)}, \quad (1)$$

where "u" is a mean, or average, vector for the input vectors, "CM" represents the covariance matrix, which is positive definite, and "T" identifies the matrix/vector transpose operation. The values of the mean vector "u" and of the covariance matrix will be determined during the training phase described below. It will be appreciated that equation Eqn. 1 corresponds to a probability value, and at this point the application of the equation to determining particular non-linear functions used by the first and second hidden layer nodes $21(j)$ and $22(k)$ will be described below.

It will further be appreciated that an input vector "X" will have a "Euclidean length" $\|X\|$ corresponding to the square root of the dot product of the vector with itself, or $$\|X\| = [X^T X]^{1/2} = \left( \sum_{i=1}^{N} X_i^2 \right)^{\frac{1}{2}}. \quad (2)$$

In that case, a unit sphere $S_N$, that is, a sphere of radius "one" in N-dimensional space, is defined to correspond to the set of all vectors X whose Euclidean length is "one". Thus, if the surface of the N-dimensional unit sphere $S_N$ is divided into a plurality of distinct surface elements each defined by a normal vector "s", and a differential of surface of the unit sphere $S_N$ is denoted "$dS_N(s)$," the Euclidean length of vector "X" is defined by the surface integral $$\|X\| = \frac{1}{2V_{N-1}} \int |X^T s| dS_N(s) \quad (3)$$

where "$V_{N-1}$" represents the volume of the corresponding "N-1" dimensional sphere, or $$V_{N-1} = \frac{\pi^{\left(\frac{N-1}{2}\right)}}{\Gamma\left[\frac{N+2}{2}\right]} \quad (4)$$

where "Γ" represents the Gamma function.

Using the equations Eqn. 2 through Eqn. 4 in connection with the neural network 10 depicted in FIG. 1, the surface integral (equation Eqn. 3) is approximated in a discrete manner using an "H"-element grid "E" over the unit sphere, where "E" denotes the collection of surface elements (distinct points on the unit sphere) represented by unit vectors $s_j$ ("j" is an index from 1 to H) or $$E = \{s_1, \ldots, s_H\} \quad (5)$$

where the surface elements "$s_j$" are generally approximately uniformly distributed over the unit sphere $S_N$. In that case, equation Eqn. 3 translates into $$\|X\| \approx \|X\|_E = \frac{DEL}{2V_{N-1}} \sum_{i=1}^{H} |X^T s_i| \quad (6)$$

where "DEL" is the surface area of unit sphere "S" divided by "H". The surface area of an N-dimensional unit sphere is given by $2\pi^{N/2}/\Gamma(N/2)$, and the volume of an "N-1" dimensional sphere is given by equation Eqn. 4, so that the multiplier in equation Eqn. 6 corresponds generally to $$\frac{DEL}{2V_{N-1}} = \frac{1}{H}\left[\frac{N\pi}{2}\right]^{\frac{1}{2}} \qquad (7)$$

which increases in accuracy as "N" gets large, but is generally accurate for small "N".

At this point, it would be helpful to provide an estimate for "H", the number of surface elements (points on $S_N$) $s_j$ into which the N-dimensional unit sphere $S_N$ is to be divided. As will be described below, in connection with equations Eqn. 13 through Eqn. 15, the value selected for "H" will also determine the number of nodes 21(j) in the first hidden layer 13 to be provided for each node 22(k) in the second hidden layer 14. In this estimation, reference is made initially to the approximation in equation Eqn. 6. In connection with that approximation, it should be noted that if "H" is initially assumed to be greater than "N," the number of dimensions of the unit sphere $S_N$, and if at least one input vector X exists for which equation Eqn. 6 is exact, then for all vectors X, $$\alpha\|X\|_E \leq \|X\| \leq \beta\|X\|_E \qquad (8)$$

where $\alpha$ and $\beta$ are scalars whose values, all of which are greater than zero, depend on the set E of surface elements $s_j$ that has been selected. In particular, values for $\alpha$ and $\beta$ are given by $$\alpha = \min\|\eta\|_E \qquad (9)$$

$$\beta = \max\|\eta\|_E \qquad (10)$$

where $\eta \in S_N$. That is, from equation Eqn. 9, $\alpha$ is the length of the shortest vector representing a surface element $s_i$ on the grid "E" defined over the unit sphere $S_N$, and from equation Eqn. 10, $\beta$ is the length of the longest vector representing a surface element $s_i$ on the grid "E" defined over the unit sphere $S_N$. A determination as to the suitability of a particular grid to a particular application can be made by comparing the values of $\alpha$ and $\beta$ to "one", as can the effect of adding or deleting surface elements to the grid.

As noted above, the covariance matrix CM for equation Eqn. 1 is positive definite, and so it can be factored using the Cholesky factorization as two matrices "L" which are transposes of each other, or $$CM = LL^T \qquad (11)$$

where all of the entries of matrix "L" above the diagonal are zero, and all entries on the diagonal are positive. The inverse of equation Eqn. 11 is $$CM^{-1} = L^{-T}L^{-1} \qquad (12)$$

where superscript "–T" represents the inverse transpose operation. Using equations Eqn. 6 and Eqn. 12, equation Eqn. 1 reduces to $$p(X) = [(2\pi)^N |CM|]^{-\frac{1}{2}} e^{-\frac{1}{2}\left[\left(\frac{DEL}{2V_{N-1}}\right)\sum_{i=1}^{H}|X^TL^{-T}s_i - u^TL^{-T}s_i|\right]^2} \qquad (13)$$

which equation provides the basis for the architecture of the hidden layers 13 and 14 of the neural network 10.

The particular non-linear functions and thresholds used by the nodes 21(j) and 22(k) of the hidden layers 13 and 14 can be readily deduced by inspection of equation Eqn. 13. Since the variables to be deduced during training are given generally by summation in equation Eqn. 13, using the dummy variable "x" to represent $X^TL^{-T}s_i - u^TL^{-T}s_i$ in equation Eqn. 13, the non-linear function used with the nodes 21(j) of the first hidden layer can be selected to be $$h_1(x) = \frac{DEL}{2V_{N-1}}|x| \qquad (14)$$

where "|x|" is the absolute value function for variable "x." With the equation Eqn. 14 selected for the non-linear function for the nodes 21(j) of the first hidden layer, the non-linear function selected for the nodes 22(k) of the second hidden layer is, from equation Eqn. 13

$$h_2(x) = [(2\pi)^N |CM|]^{-\frac{1}{2}} e^{-\frac{1}{2}x^2} \qquad (15).$$

It will be appreciated that the factor "$(DEL/2V_{N-1})$" is a constant that can be selected to be in the definition for the non-linear function for either the nodes of the first hidden layer (equation Eqn. 14) or the nodes of the second hidden layer (equation Eqn. 15), or alternatively may be incorporated into the interconnection weights between the input terminals 11 and the nodes 21(j) of the first hidden layer. In either case, the non-linear function selected for the nodes 22(j) of the first hidden layer will simply correspond to the absolute value function.

Similarly, the coefficient of the exponential function in equation Eqn. 15 can be incorporated into interconnection weights between the nodes 23(k) of the second hidden layer 14 and the output nodes 24(l), in which case the non-linear function used for the second layer nodes simplifies to $$h_2(x) = e^{-\frac{1}{2}x^2} \qquad (16)$$

in which case nodes 22(k) having the same non-linear function can be used throughout the second hidden layer.

Returning to equation Eqn. 13, it will be recognized that, in each addend of the summation represented by the dummy variable "x," is present a subtrahend $$t_i = u^TL^{-T}s_i \text{ for } i = 1, \ldots, H \qquad (17)$$

which values essentially represent threshold values for the nodes 21(j) of the first hidden layer 13, and which are also determined during training. The threshold values for the nodes 22(k) of the second hidden layer 14, on the other hand, also from equation Eqn. 13, are identically zero. Since, in equation Eqn. 13 the summation in the exponential extends from one to "H", the equation also suggests that the number of first layer nodes 21(j) of the first hidden layer, connected to each node 22(k) in the second hidden layer is also "H", as was previously noted in connection with equations Eqn. 8 through Eqn. 10. Since the number of second layer nodes 22 corresponds to the number of components in the outcome classes, identified as "K," and since further each node 21(j) in the first hidden layer is connected to only one node 22(k) in the second hidden layer, as suggested by equation Eqn. 13, the number of nodes 21(j) in the first hidden layer corresponds to the value "H" multiplied by "K".

Further characterizing the architecture of the neural network 10, equation Eqn. 14 also provides the basis for determining the weights $w_1(i,j)$ between an input terminal 20(i) and a node 21(j) of the first hidden layer. From that equation, it is clear that such weights correspond to the multipliers for the components of the input vector X, or $$w_1(i,j) = \{L^{-T}s_i\}, i = 1, \ldots, N; j = 1, \ldots, H \qquad (18)$$

Here again, since "L" corresponds to a Cholesky factor of the covariance matrix CM, these interconnection weights are determined during training.

The interconnection weights $w_2(j,k)$ between the nodes 22(j) and 23(k) of the first and second hidden layers 13 and 14, on the other hand are all "one", that is, the nodes 23(k) do not weight the values represented by the signals from the nodes 22(j) in performing processing thereon. This follows from equation Eqn. 3, from the fact that the surface integral in that equation is not weighted, and from equations Eqn. 5 and Eqn. 6, from the fact that the grid "E" defining the surface elements $s_j$ on the N-dimensional sphere $S_N$ is approximately uniform. As a result, the differential of surface area of the unit sphere, represented by the variable "DEL" in the equation, is a constant for the "H" surface elements of the grid "E." If, instead of using equation Eqn. 6 to approximate the surface integral in equation Eqn. 3, the surface integral is approximated by $$\|X\|_E = \frac{1}{2V_{N-1}} \sum_{i=1}^{H} DEL_i |X^T s_i| \quad (19)$$

where $DEL_i$ are coefficients of a selected quadrature rule for integration over the surface of the N-dimensional unit sphere, then the interconnection weights $w_2(j,k)$ between node 22(j) and 23(k) of the first and second hidden layers 13 and 14 will be given by $$w_2(j,k) = DEL_j, j=1, \ldots, H; k=1, \ldots, K \quad (20).$$

With the nodes 21(j) and 22(k) of the first and second hidden layers 13 and 14 as described above, and the respective interconnection weights $w_1(i,j)$ between the input terminals 20(i) and first layer nodes 21(j) and $w_2(j,k)$ between the first layer nodes 21(j) and second layer nodes 22(k) also as described above, the architecture of the output nodes 23(l) and interconnection weights $w_3(k,l)$ will now be described. As noted above, each output node 23(l) in the output layer 12 receives the likelihood values from all of the nodes 22(k) and generates in response a value indicating the likelihood that the input vector X is properly classified in the class associated with the respective output node 23(l).

As in the above, "K" corresponds to the number of population components [corresponding in turn to the number of nodes 22(k) in the second hidden layer 14] in the different outcome classes of the neural network 10, and if there are "L" possible output classes [which corresponds to the number of output nodes 23(l)], the output of each output node 23(l) will be some combination of the K components from second layer nodes 22(k). If m(k,l) denotes the mixing proportion of the output from the "k-th" second layer node 22(k) in the output of the "l-th" output node 23(l), the mixing proportions m(k,l) for the "l-th" output node 23(l) will be non-negative and given by $$\sum_{k=1}^{K} m(k,l) = 1. \quad (21)$$

Using the likelihood function in equation Eqn. 1, the output of an output node 23(l) will be given by $$g_l(X) = \sum_{k=1}^{K} m(k,l) p_k(X), \quad (22)$$

in which case the classification provided by the neural network will be that associated with the output node 23(l) for which the result given by equation Eqn. 22 is a maximum. The values of the mixing proportions m(k,l) thus correspond to the weights $w_3(k,l)$ and will be determined during training. Since the classification provided by the neural network corresponds to the output node 23(l) for which the result in equation Eqn. 22 is a maximum, the output nodes 23(l) need not use a non-linear function in generating their outputs.

The neural network 10 can be trained in both a supervised training mode and an unsupervised training mode, both of which will now be described. In the supervised training mode, the value for "K", the number of second hidden layer nodes 22(k) associated with each, will be determined. It will be recalled that the number of first hidden layer nodes 22(i) is approximated using equations Eqn. 9 and Eqn. 10, above. After determining the value for "K" a number of training input vectors "X" having a known correct classification are applied to the input terminals 20(i) and the various adjustable parameters, including threshold values $t_j$ for the nodes 21(j) of the first hidden layer, as well as the weighting values $w_1(i,j)$ between the input terminals 20(i) and the first layer nodes 21(j), and $w_3(k,l)$ between the second layer nodes 22(k) and the output nodes 23(l), are adjusted to provide correct results for all or a large portion of training input vectors X. (It will be recalled that the weights $w_2(j,k)$ between the first layer nodes 21(j) and second layer nodes 22(k) are all unity or, if not unity, are otherwise determined based on the particular architectures of the respective nodes, but not by training). These operations may be repeated for various values of "K", and one of the values of "K" will be selected which provides for optimal correct classification.

In unsupervised training, the correct classification for each training input vector is not known a priori, but is determined using criteria in some way intrinsic to or presumed in the sets of "T" training input vectors $X_t$ (index t=1 to T).

In connection with supervised training, after selection of a value for "K", the training operation determines, separately for each outcome class associated with each output node 23(l), the weighting values $w_1(k,l)$ for the output node 23(l), and the components $u_i$ of the average input vectors and of the covariance matrices $CM_i$ associated with each component population density. From the values for $u_i$ and $CM_i$, the thresholds and weights for the first layer nodes 21(j) are determined using equations Eqn. 17 and Eqn. 18. The supervised training methodology makes use of an "expectation-maximization" (EM) algorithm. For each particular outcome class "c", the supervised training methodology uses a set of training vectors X comprising "T" training vectors $X_t$ (index t=1 to T). It should be noted that the training methodology does not require that the same number, T, of training vectors be used for each given output class. The training methodology begins with an initial guess for each of the values of $a_k$, $u_k$ and $CM_k$ of a parameter vector PV(st) for supervised training, given by $$PV(st) = \{(a_k, u_k, CM_k), k=1, \ldots, K\} \quad (23)$$

where $a_k$ represents the mixing proportion of the output from the "k-th" second layer node in the output of the "l-th" output node 23(l) associated with class "c" and thus corresponds to $w_3(k,l)$.

The initial guesses for the components of PV(st) are applied to a likelihood function $$g(X|PV(st)) = \prod_{t=1}^{T} \sum_{k=1}^{K} a_k [2\pi^N |CM_k|]^{-\frac{1}{2}} e^{-\frac{1}{2}(X_t - u_k)^T CM_k^{-1}(X_t - u_k)} \quad (24)$$

to generate a likelihood value. The algorithm is applied iteratively during training, during each iteration generating new values for $a_k$, $u_k$, and $CM_k$, until the value provided by the likelihood function in equation Eqn. 24 corresponds to at least a relative maximum. In each iteration, a conditional likelihood value for each training input vector associated with a particular output class "c" is generated corresponding to $$CL_{kt} = \frac{1}{D_t} \ a_k |CM_k|^{-\frac{1}{2}} e^{-\frac{1}{2}(X_t - u_k)CM_k^{-1}(X_t - u_k)} \quad (25)$$

where $D_t$ is a normalization factor so that the sum of values generated using equation Eqn. 25 for all training input vectors is "one." In that case, the weighting values $a_k$ for each output node 23($l$) corresponds to $$a_k = \frac{1}{T} \sum_{t=1}^{T} CL_{kt} \quad (26)$$

the value of $u_k$ is given by $$u_k = \left(\frac{1}{a_k}\right)\left(\frac{1}{T}\right) \sum_{t=1}^{T} CL_{kt} X_t \quad (27)$$

and the value of the covariance matrix $CM_k$ is given by $$CM_k = \left(\frac{1}{a_k}\right)\left(\frac{1}{T}\right) \sum_{t=1}^{T} CL_{kt}(X_t - u_k)(X_t - u_k)^T \quad (28)$$

The values determined using equations Eqn. 26 through Eqn. 28 are applied to equation Eqn. 24 to determine a new value for the likelihood function, and Eqn. 25 to determine a new conditional likelihood value. If the value of the likelihood function during a particular iteration is larger than that during the preceding iteration, the new conditional likelihood value is used in connection with equations Eqn. 26 through Eqn. 28 to determine updated values for the iteration; otherwise, the values determined from equations Eqn. 26 through Eqn. 28 during the preceding iteration are used as the respective weighting values $a_k$, $u_k$ and $CM_k$. It will be appreciated that this operation may be repeated several times using different starting values for the weighting values $a_k$, $u_k$ and $CM_k$, to determine several diverse sets of results, and select the one set of results providing the largest likelihood value (equation Eqn. 24). These operations will be repeated for each outcome class. In addition, these operations may be repeated for selected values of "K" as noted above.

In performing unsupervised training, the outcome classes, associated with the various nodes 23($l$) of the output layer 12, for each training input vector X, are not known a priori. As a result, the outcome classes are assumed to be determinable using criteria that are intrinsic to the training input vectors. In the training operation, the collection of mixing proportions $a_{kl}$ used to characterize the various outcome classes represented by the output nodes 23($l$) of the output layer 12 are determined. In determining the mixing proportions, significant clusters in the training input vectors are determined to comprise component populations, related to nodes 22($k$) of the second input layer 14 for the various outcome classes represented by nodes 23($l$) of the output layer 12.

In unsupervised training, it is assumed that diverse training input vectors X used to train the neural network 10 be organized into blocks, and that within each block the input vectors be ordered according to a temporal or similar sequence according to some parameter "t." The individual input vectors in each sequence will be identified $X_t$. The ordering of input vectors $X_t$ within a block suggests that the sequence effectively forms a finite state hidden Markov model. Finite state hidden Markov models are described, for example, in L. Rabiner, "A Tutorial On Hidden Markov Models And Selected Applications In Speech Recognition" Proceedings of the IEEE, Vo. 77, No. 2, pp. 257–286 (February, 1989), particularly pp. 258–266, incorporated herein by reference. Generally, a hidden Markov model is defined by a collection of states and transitions from each state to one or more other states, along with a probability for each transition. Each state of the hidden Markov model is deemed to correspond to an outcome class of the neural network 10, and thus to correspond to a node 23($l$) of the output layer 12.

If the sequence of input vectors $X_t$ in a block is represented by $\{X_1, X_2, \ldots, X_T\}$, a(k,l) represents the mixing proportion of a component output from a node 23($k$) of the second hidden layer in an outcome class provided by an output node 24($l$), (that is $W_3(k,l)$) and u(k,l) and CM(k,l) represent the mean vector and covariance matrix, respectively, of the input vector sequence in the outcome class provided by output node 24($l$), the likelihood function of that outcome class is given by $$g_l(X) = \sum_{k=1}^{K} a(k,l) \ [(2\pi^N |CM_{kl}|]^{-\frac{1}{2}} e^{-\frac{1}{2}(X_t - u_{kl})^T CM_{kl}^{-1}(X_t - u_{kl})} \quad (29)$$

The parameter vector PV(ut) for unsupervised training, which characterizes the "L" outcome classes is given by $$PV(ut) = \{c, STPM, (a(k,l), u_{kl}, CM_{kl}), k=1, \ldots, K, \ l=1, \ldots, L\} \quad (30)$$

which, it should be noted, is similar to the parameter vector PV(st) for supervised training noted above, with the addition of a vector $c = \{c(l)\}$, $l=1, \ldots, L$, representing an initial state probability vector of the Markov model and the matrix STPM={STPM(i,l)} denoting the state transition probability matrix of the Markov model.

The values for the components of parameter vector PV(ut) are determined by applying the Baum-Welch re-estimation algorithm which is described in, for example, the aforementioned Rabiner paper. In that operation, initially, a series of vectors $f_t(i)$ are defined by a forward recursion procedure initialized for t=1 by $$f_1(i) = c_i g_i(X_1) \quad (31)$$

for all "i" from 1 to L and for $t=2, \ldots, T$ by $$f_t(i) = \left[ \sum_{i=1}^{L} f_{t-1}(i) STPM(i,j) \right] g_j(X_t) \quad (32)$$

for all "j" from 1 to L. Similarly a series of vectors $b_t(i)$ are defined by a backward recursion that is initialized for t=T by $$b_T(i) = 1, \ i=1, \ldots L \quad (33)$$

and for $t=T-1, \ldots 1$ by $$b_t(i) = \sum_{j=1}^{L} STPM(i,j) b_{t+1}(j) g_j X_{t+1}. \quad (34)$$

for all i from 1 to L. With the vectors $f_t(i)$ and $b_t(i)$ as defined in equations 31 through 34, the likelihood function is given as $$g(x|PV(ut)) = \sum_{i=1}^{L} f_t(i) b_t(i) \quad (35)$$

for each t from 1 to T.

In unsupervised training, the forward and backward vectors $f_t(i)$ and $b_t(i)$ are used to determine the likelihood that a particular series of input vectors $X_t$ from an input vector block has caused the neural network to go into a particular state "j" in the Markov chain at time "t" and into a particular state "k" at time "t+1." In accordance with the Baum-Welch method, this conditional likelihood is given by $$CL^1(j,k) = \frac{1}{g(X|PV(ut))} f_t(j)STPM(j,k)g_k(X_{t+1})b_{t+1}(k) \quad (36)$$

for t from 1 to T-1.

The forward and backward vectors $f_t(i)$ and $b_t(i)$ are also used to determine the conditional likelihood that the Markov chain is in a state "j" at time "t" and that the "i-th" mixture component was sampled to produce the vector $X_t$, in particular $$CL^2(i,j) = \left[ \frac{1}{g(X|PV(ut))} \right] f_t(j)b_t(j)\theta_{ijt} \quad (37)$$

where $$\theta_{ijt} = \frac{1}{D_{jt}} a(i,j)|CM_{ij}|^{-\frac{1}{2}} e^{-\frac{1}{2}(X_t-u_{ij})^T CM_{ij}^{-1}(X_t-u_{ij})} \quad (38)$$

and $D_{jt}$ is a normalizing factor that ensures that the sum of the conditional likelihoods given by equation Eqn. 35 is "one", that is $$D_{jt} = \sum_{i=1}^{K} a(i,j)|CM_{ij}|^{-\frac{1}{2}} e^{-\frac{1}{2}(X_t-u_{ij})^T CM_{ij}^{-1}(X_t-u_{ij})} \quad (39)$$

Pursuant to the Baum-Welch method, the components of the parameter vector are iteratively determined using the conditional likelihoods represented above in equations Eqn. 36 and Eqn. 37. In particular, beginning with an initial value $$PV(ut)=\{c(0), STPM(0), [a(i,j)(0), u(i,j)(0), CM(i,j)(0)]\} \quad (40)$$

for one block of input vectors $X=\{X(1), \ldots X_T\}$, the new values for the components of the parameter vector are given as:

$$c'_j = \sum_{k=1}^{L} CL^1(j,k) \quad (41)$$

$$STPM(j,k)' = \frac{1}{STPM_N} \sum_{t=1}^{T-1} CL^1(j,k) \quad (42)$$

$$a(k,l)' = \frac{1}{a_N} \sum_{t=1}^{T-1} CL^2(k,l) \quad (43)$$

$$u_{kl}' = \frac{1}{u_N} \sum_{t=1}^{T-1} CL^2(k,l)X_t \quad (44)$$

and $$CM_{kl}' = \frac{1}{u_N} \sum_{t=1}^{T-1} CL^2(k,l)(X_t - u_{ij})(X_t - u_{ij})^T \quad (45)$$

where $STPM_N$, $w_N$, and $u_N$ are normalizing factors given by $$STPM_N = \sum_{t=1}^{T-1} \sum_{k=1}^{K} CL^1(j,k) \quad (46)$$

$$a_N = \sum_{t=1}^{T-1} \sum_{k=1}^{K} CL^2(j,k) \quad (47)$$

and $$u_N = \sum_{t=1}^{T} CL^2(j,k). \quad (48)$$

After the new values for the components of the parameter vector PV(ut) are determined, they are applied to the likelihood function given in equation Eqn. 29, and the process is repeated until the value provided by equation Eqn. 29 is a relative maximum. It will be appreciated that the relative maximum may not constitute a global maximum, and it may be advantageous to repeat these operations with various values for the initial parameter vector PV(ut) (0) (equation Eqn. 40).

Extending the Baum-Welch methodology to input vectors organized in multiple blocks, separate forward and backward vectors $f_t(i)$ and $b_t(i)$ may be determined for each block, as well as separate conditional likelihoods, equations Eqn. 36 and Eqn. 37. An initial parameter vector PV(ut) (0) is then selected, and equations Eqn. 39 through 46 applied, except that the respective sums in are taken both over the "t" variable, for a determination of the respective parameter vector component over each block, and then over all blocks. The equations for the normalization factors equations Eqn. 46 through 48 are modified accordingly.

It will be appreciated that training according to the above-described methodologies may not provide an explicit value for "K," the number of component populations, and thus the number of nodes 22(k) in the second hidden layer. However, in training the neural network 10, a value for "K" can be initially be estimated and adapted as the training procedure progresses. Alternatively, various sets of training operations can be pursued using diverse values for "K," and one of these values selected depending on the training results.

The invention provides a new neural network architecture having nodal non-linear functions and thresholds which are quite different from those used previously. The new architecture permits use of training methods that permit conditioning of the various weights $w_i(i,j)$ and thresholds for the nodes using computational methods, thus in turn permitting a ready understanding of their physical significance or relationship to the particular use to which the neural network is to be applied.

New supervised and unsupervised training arrangements are provided for the multivariate Gaussian mixtures comprising the outcome classes using the available training data. All interconnection weights between layers and all node thresholds within each layer are generated simply and directly from the trained Gaussian mixture expressions. The first two layers of the neural network are an embodiment of an integral geometry interpretation of the components in the mixture.

While the particular non-linear functions selected for the first and second layer nodes in equations Eqn. 11 and Eqn. 12 follow from the exponential function in equation Eqn. 10, it will be appreciated that, in the non-linear function for the first layer nodes 21(j) the absolute value function in equation 11 may, instead of being taken to the first power, instead be taken to any power, and with suitable adjustment of the power used in the exponential in equation Eqn. 12 for the non-linear function for the second layer nodes 22(k).

While the neural network described above in connection with FIG. 1 is primarily directed to classification in which the outcome classes are characterized by mixtures of multivariate densities, with each of the component populations having Gaussian distributions, it will be appreciated that domains with non-Gaussian distributions can in a number of instances be approximated by a function of component populations each of which exhibit the required Gaussian distribution. The neural network architecture described above can be used in connection with these types of domains as well, essentially by providing a neural network for each of the Gaussian components used to approximate the non-Gaussian component.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A neural network for classifying input vectors to one of a plurality of outcome classes comprising:

an input layer comprising a plurality of input terminals each for receiving a component of an input vector;

two hidden layers, including (i) a first hidden layer having "H" first layer nodes, each being connected to the input terminals for receiving the input vector components from the input terminals and for generating a first layer output value representing the absolute value of the sum of the difference between a function of each input vector component and a threshold value, wherein the threshold value is determined as $$t_j = uT\ L - T\ s_j,$$

where "u" is a mean vector of training input vectors used to train the neural network during the training operation, "L" is a Choleski factor of a covariance matrix for the training input vectors, "T" and "−T" represent a transpose and inverse transpose operation, respectively, and "$s_i$" represents a vector defining a surface point on an H-component grid defined on a unit sphere having a number of dimensions corresponding to the number of components of an input vector, and (ii) a second hidden layer including a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values from the first layer nodes connected thereto; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector.

2. A neural network as defined in claim 1 in which the function of each input vector component applied by the "j-th" first layer node ("j" is an integer from "1" to "H") to an input vector component value received from the "i-th" input terminal ("i" is an integer from "1" to "N") in said first layer is the "j-th" component of $$w_1(i,j) = [L^{-T} s_i]_j,$$

where "L" is a Choleski factor of a covariance matrix for the training input vectors, "−T" represents an inverse transpose operation, and "$s_i$" represents a vector defining a surface point on an H-component grid defined on a unit sphere having a number of dimensions corresponding to the number of components of an input vector.

3. A neural network for classifying input vectors to one of a plurality of outcome classes comprising:

an input layer comprising a plurality of input terminals each for receiving a component of an input vector;

two hidden layers, including (i) a first hidden layer including a plurality of first layer nodes each connected to the input terminals for receiving the input vector components from the input terminals and for generating a first layer output value according to a first layer non-linear function representing the absolute value of the sum of the difference between a function of each input vector component and a threshold value, and (ii) a second hidden layer including a plurality of second layer nodes each for generating an outcome class component value, each second layer node being connected to predetermined ones of the first layer nodes and generating in response to the first layer output values an outcome class component value according to a second layer non-linear function related to the exponential of the negative square of the sum of first layer output values from the first layer nodes connected thereto, wherein the outcome class component value for a second layer node conforms to the likelihood p(X) of a component class mixture given by $$p(X) = [(2\pi)^N |CM|]^{-\frac{1}{2}} e^{-\frac{1}{2} \left( \frac{DEL}{2V_{N-1}} \sum_{i=1}^{H} |x^T L^{-T} s_i - u^T L^{-T} s_i| \right)^2}$$

where N is the number of input terminals, u is a mean vector of training input vectors, CM is a covariance matrix, L is a Cholesky factor of CM, T identifies a transpose, $s_i$ is a vector defining a surface point on an H component grid defined on a unit sphere of N dimensions, $V_{N-1}$ is the volume of an N−1 dimension sphere, DEL is the surface area of an N-dimensional unit sphere divided by H, H is the number of surface elements on the N-dimensional unit sphere; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector.

4. A neural network as defined in claim 3 in which the outcome class component values generated by the second layer nodes reflects a threshold value of zero.

5. A neural network as defined in claim 3 in which the second layer nodes all apply the same weighting value in connection with first layer output values they receive from the first layer nodes in generating the respective outcome class component values.

6. A neural network as defined in claim 3 in which the outcome class value generated by each output node in the output level reflects a threshold value of zero.

7. A neural network as defined in claim 3, trained in accordance with a supervised training operation in which a plurality of training input vectors each of known outcome class is applied to the neural network and threshold values and weighting values of said first layer nodes, and weighting values of said output nodes are determined to identify the outcome class for each training input vector.

8. A neural network for classifying input vectors to one of a plurality of outcome classes comprising:

an input layer comprising a plurality of input terminals each for receiving a component of an input vector;

two hidden layers, including (i) a first hidden layer including a plurality of first layer nodes each connected to the input terminals for receiving the input vector components from the input terminals and for generating a first layer output value representing the absolute value of the sum of the difference between a function of each input vector component and a threshold value, and (ii) a second hidden layer including a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values from the first layer nodes connected thereto; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector; and trained in accordance with an unsupervised training operation in which a plurality of sets of training input vectors, each of unknown outcome class, related within each set by a predetermined parameter, are applied to the input terminals and the threshold values and weighting values of said first layer nodes and weighting values of said output nodes are determined so that each set of training input vectors is a sequence of a hidden Markov model and each outcome class represented by one of said output nodes is a state of the hidden Markov model.

9. A method of training a neural network, the neural network classifying input vectors to one of a plurality of outcome classes, under the assumption that the outcome classes are characterized by mixtures of component populations with each component population having a multivariate Gaussian likelihood distribution, the neural network comprising an input layer comprising a plurality of input terminals each for receiving an component of an input vector, two hidden layers, including (i) a first hidden layer including a plurality of first layer nodes each connected to the input terminals for receiving the input vector components from the input terminals and for generating a first layer output value representing the absolute value of the sum of the difference between a function of each input vector component and a threshold value, and (ii) a second hidden layer including a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values from the first layer nodes connected thereto; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector, the method comprising the steps of:

selecting a value for "K" corresponding to the number of second layer nodes;

applying a plurality of training input vectors each of known outcome class to the neural network to generate threshold values and weighting values of said first and second layer nodes;

determining a value corresponding to the number of correct classifications by the neural network of the training input vectors; and performing the selecting, applying and determining steps through a plurality of iterations each with a different value for "K" and selecting the neural network with a value for "K" and the threshold and weighting values determined which provide the optimal classification.

10. A method of training a neural network, the neural network classifying input vectors to one of a plurality of outcome classes, under the assumption that the outcome classes are characterized by mixtures of component populations with each component population having a multivariate Gaussian likelihood distribution, the neural network comprising an input layer comprising a plurality of input terminals each for receiving an component of an input vector, two hidden layers, including (i) a first hidden layer including a plurality of first layer nodes each connected to the input terminals for receiving the input vector components from the input terminals and for generating a first layer output value representing the absolute value of the sum of the difference between a function of each input vector component and a threshold value, and (ii) a second hidden layer including a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values from the first layer nodes connected thereto; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector, the method comprising the steps of:

selecting a value for "K" corresponding to the second of second layer nodes;

applying a plurality of sets of training input vectors each of unknown outcome class, the training input vectors being related within each set by a predetermined parameter, so that each set of training input vectors is a sequence of a hidden Markov model and each outcome class represented by one of said output nodes is a state of the hidden Markov model to the neural network to generate threshold values and weighting values of said first and second layer nodes;

determining a value corresponding to the number of correct classifications by the neural network of the training input vectors; and performing the selecting, applying and determining steps through a plurality of iterations each with a different value for "K" and selecting the neural network with a value for "K" and the threshold and weighting values determined which provide the optimal classification.

* * * * *